Dec. 23, 1958        G. S. CLEMENS        2,865,071
INCONSPICUOUS CORD WINDING AND STORING DEVICE
Filed Nov. 1, 1955
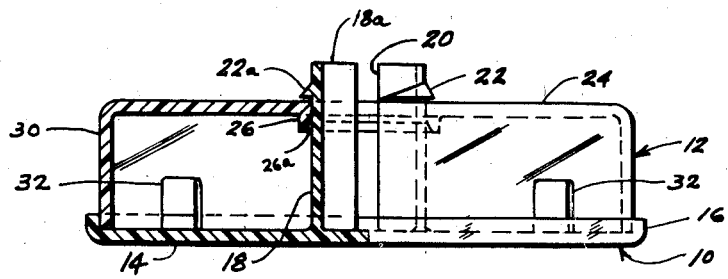
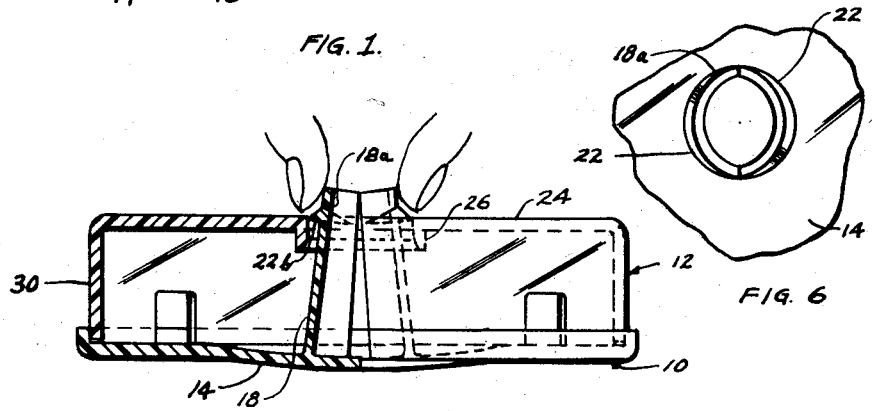
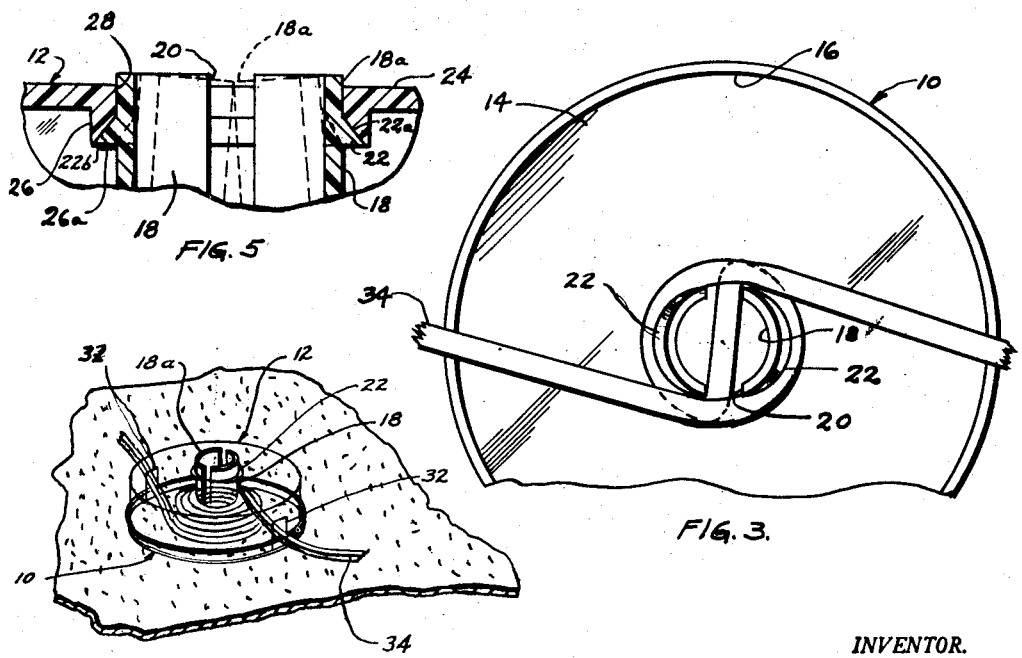
INVENTOR.
GEORGE S. CLEMENS
BY *George E Frost*
ATTORNEY

United States Patent Office 2,865,071
Patented Dec. 23, 1958

2,865,071

INCONSPICUOUS CORD WINDING AND STORING DEVICE

George S. Clemens, Chicago, Ill.

Application November 1, 1955, Serial No. 544,214

1 Claim. (Cl. 24—71.2)

My invention relates to an improved cord reel particularly suited for winding and storing electric cord leading to a household appliance and characterized by an apparently small size and unobtrusive appearance when in use.

In the present invention, a device is provided for winding and storing cord which is small, compact, and inconspicuous and is adapted to sit flat on the floor. The device is constructed of transparent plastic material which permits the rug or other floor covering to show through and thus blend with it. Because of the material used and because of the way the cord is wound, the device appears to be much smaller than it actually is. The device itself becomes almost invisible and a surprising amount of cord can be neatly wound so as to be most inconspicuous. In the construction shown and described a disk-shaped housing of transparent material is formed by separable base and cover parts. The base has a centrally disposed upstanding sleeve with opposed longitudinal slots extending the entire length of the sleeve. The cover has a central circular opening which receives this sleeve and is held in down position by a pair of opposed shoulders, or locking flats, located on the outside of the sleeve 90° from the opposed slots. The circular cover has a marginal skirt depending from its outer edge with two diametrically opposed openings through which the cord passes into and out of the device. Assembly of the unit is accomplished by pushing the cover down over the sleeve, at which time the sleeve parts flex together under the cam action of the top faces of the locking flats to pass the cover and thereafter snap outwardly to lock the parts together. To disassemble the parts, the parts of the sleeve on either side of the longitudinal slots are pressed together by gripping protruding portions provided for the purpose. This retracts the locking flats sufficiently to permit removal of the cover from the sleeve.

In use, the electric cord passes through the two opposed openings in the skirt and into the housing, where it is threaded through the longitudinal slots in the centrally disposed sleeve. When the base, and hence the sleeve, is rotated in relation to the cover, the cord winds around the sleeve inside the housing to wind up the desired amount of cord.

It is therefore a general object of the present invention to provide an inconspicuous winding and storing device for electric cords.

It is a further object of the present invention to provide a winding and storing device which creates the illusion that the wound reel of cord is smaller than it actually is.

It is another object of the present invention to provide an improved cord winding and storing device which rests on the floor and blends into the background, irrespective of the color and texture of the surface upon which it rests.

It is yet another object of the present invention to provide a two-unit improved cord winding and storing device where the hub on which the cord is stored serves through flexural action as a spring detent to hold the cover in place.

It is an additional object of the present invention to provide an improved two-part cord winding and storing device which is easily assembled and disassembled; uses readily available plastic materials; is of simple construction; and is inexpensive to manufacture.

The novel features which I believe to be characteristic of my invention are set forth with particularity in the appended claim. My invention itself, however, together with further objects and advantages thereof, will best be understood by reference to the following description taken in conjunction with the accompanying drawings in which:

Figure 1 is a side elevational view, partly in axial cross section, showing the device constructed in accordance with the present invention in the assembled condition;

Figure 2 is a view similar to Figure 1 showing how the outboard portions of the sleeve are pinched together to retract the cover locking flats to remove the cover;

Figure 3 is a fragmentary top plan view of the base showing the cord threaded through the slots and wound around the sleeve;

Figure 4 is a view in perspective showing the device of Figures 1 to 3 with cord wound thereon and resting on a rug;

Figure 5 is a fragmentary view of the device of Figures 1 to 4 showing how the beveled face of the locking shoulders serves to cam the sleeve parts together to assemble the unit; and Figure 6 is a fragmentary top plan view showing the sleeve parts in collapsed condition to pass through the circular opening in the cover.

Figure 1 shows the assembled disk-shaped housing with the left hand half of the assembly in axial cross section. The unit comprises a base part, shown generally at 10, and a cover part, shown generally at 12. The two parts are made of transparent material, preferably clear polystyrene. The base part 10 consists of a circular disk 14 with an upstanding marginal flange 16 at its outer periphery to define a very shallow cup conformation. The disk part 14 has a centrally disposed upstanding sleeve 18. The sleeve 18 has a pair of longitudinal slots 20 diametrically opposed to each other and extending from the flat disk 14 to the top of the sleeve to divide the sleeve into two sections. On the outer surface of the sleeve are two shoulders, or locking flats, 22 which, as shown, protrude outwardly in diametrically opposed areas. The locking flats 22 are located in spaced relationship to the disk portion 14 so that the cover 12 fits under the locking flats and is held in assembled position when the unit is assembled. The sleeve 18 further has an upper portion 18a extending above the locking flats 22 a sufficient distance to permit the application of pressure to this portion by the fingers as shown in Figure 2.

Each locking flat 22 encircles one side of the sleeve between the two longitudinal slots 20. As shown best in Figure 3, the outer peripheries of the locking flats are not concentric with the outer periphery of the sleeve. Rather these outer edges are constructed to have greatest outboard reach at a point midway between the two longitudinal sleeve slots. As the locking flats extend away from these points of maximum reach towards the two slots, they gradually decrease in their outboard reach. When in the collapsed condition the outer edges of the flats 22 define a circle capable of passing through circular opening 28. At the slots, the locking flats are flush with the sleeve. The lower surface 22b of each locking flat is normal to the surface of the sleeve to provide a stop or shoulder for the cover 12 when in assembled position as shown in Figure 1. The upper surface of each locking flat is beveled at 22a. This bevel provides a camming surface which bears against the cover plate 12 as the cover plate is installed over the sleeve as is described in detail hereafter.

The cover part 12 consists of a circular disk portion 24 having a depending cylindrical skirt 30 at its outer periphery. The diameter of the disk portion 24 is such that the depending skirt 30 will, when the unit is assembled,, fit inside the upstanding flange 16 on the base section 10. The disk portion 24 has a centrally disposed opening 28 large enough to receive the sleeve 18. A circular flange 26, depending from the disk portion 24, encircles the opening 28. The flange 26 has an upward conical bevel at its lowermost portion to form a face, 26a, which coacts with face 22a to provide the cam action hereinafter described. The skirt 30 has two diametrically opposed openings 32 in its lower edge, to receive the cord which is to be wound and stored.

In assembling the unit, the cover section 12 is placed over the sleeve and pushed downward. The lower beveled face 26a of the part 12 bears against the upper beveled face 22a of the cylindrical sleeve 18 to provide camming action to urge the two parts of sleeve 18 towards collapsed position. Since the base 14 is somewhat flexible and the sleeve 18 is divided into two opposed parts by the longitudinal slots, the upper portions of the sleeve adjacent the locking flats collapse togehter under the pressure applied by the cover to the camming surface 22a to permit the cover section 12 to snap over the outward reach of the locking flats as shown in Figure 2. The sleeve 18 then expands out to normal position wherein the cover section 12 is held in position by the lower locking surfaces 22b of the locking flats. The above-described snap action is shown in Figure 5. The solid lines of that figure show the cover positioned over the sleeve 18 at the point where further assembly motion produces cam action. The dotted lines of the figure show the sleeve parts collapsed together to pass the cover.

The cover 12 is removed by gripping the protruding portions 18a of the sleeve 18 to collapse the sleeve parts together as shown in Figure 2. The cover 12 can then be lifted up to pass over the stop faces 22b and thus be free.

Although the disk portion 14 is somewhat flexible to permit compressing the sections of the sleeve together at their upper ends it should be sufficiently rigid to permit the natural tightening of the cord around the lower portion of the sleeve without flexing the sections of the sleeve together.

In use, the appliance cord 34 is first threaded through the slots 20 of the sleeve 18. The cover 12 is then snapped into position as above described, with the windows or openings 32 positioned to receive the cord 34. At this time the unit is assembled, with the cord 34 passing through one window 32, the slots 20, and the other window 32. The cover 12 can now be held in one hand and the base 10 in the other hand and the base rotated in relation to this cover. The position assumed by the cord 34 after the base is rotated three-quarters of a revolution is shown in Figure 3. Further rotation winds the cord 34 on the sleeve 18 in a double spiral conformation, forming a wound cord configuration as shown in Figure 4. It will be noted in this connection that the winding operation is carried on without disturbing the orientation of the cord as it passes through the windows 32.

While the cord is wound up as above, there is a natural tendency for the cord to collapse the two parts of the sleeve 18 together. However, since the base 14 and the sleeve 18 are both made of comparatively thick material and are thus rather rigid, this action does not collapse the sleeve 18 to a degree sufficient to free the cover 12 from the base 10. However, since the fingers grip the protruding portions 18a of the sleeve 18 to remove the cover 12, as shown in Figure 2—and thus act at points where there is a maximum leverage and an effective bearing surface—the user can nevertheless release the cover 12 and disassemble the unit without difficulty.

All of the parts of the device are constructed of a transparent material, such as clear polystyrene. It will be noted in this connection that they are suited for plastic molding operations and that accordingly effective and inexpensive manufacture can be obtained by molding the parts of plastic. The transparent character of the parts serve two functions. First, as shown in Figure 4, when the unit is placed on a surface—such as a rug—having a particular color and texture the observer sees through the device to the underlying surface. In consequence the color and texture of the underlying surface are observed and not the device. Secondly, the transparent construction gives rise to the illusion that the device is smaller in size than it is in fact. This is believed to be due to optical effects associated with the passage of light through the particular conformations of the device, that is the mating cup-shaped parts with the central sleeve upon which the cord is wound. In any event the observer sees what appears to be a smaller device than is in fact present, and the device is thus made less noticeable than otherwise would be the case.

A device of the present invention is not critical in relation to the particular type of floor covering upon which it is placed. This is because the color and texture of the floor covering are seen through the transparent parts of the device, so that whatever shade and color may be in the floor covering—and whatever texture or design it may have—the observer perceives that color and texture. When it is recalled that devices of this kind should have a maximum degree of flexibility in application, and it is not possible to manufacture them in a variety of colors to accommodate all the various floor covering colors and shades, the utility of this construction is evident. Additionally, the illusion of small size incident to the transparent construction further aids in making the device inconspicuous.

The transparency has the further advantage of permitting the user to observe the lay of the cord as it is wound. In the normal use of the device this is important as electric cords tend to wind unevenly and jam due to kinks or twists that are not apparent when only the cord outside the device can be seen. With the present device the user observes the lay of the cord in the device and thus can see and correct any kinks or twists, as well as any tendency of the cord to wind unevenly rather than uniformly between the several layers of coiled cord permitted by the depth of the unit and for which the unit is designed.

While I have shown and described a specific embodiment of the present invention, it will, of course, be understood that many modifications and alternative constructions may be made without departure from the spirit and scope thereof.

What I claim as new and desire to secure by Letters Patent of the United States is:

A winding and storing device for an elongated electric cord adapted to lie flat on, and inconspicuously blend in with, a floor covering to create the illusion that the device is smaller than it is, the device comprising: a flat base made of transparent material having a circular disk portion and an upstanding centrally disposed sleeve, the sleeve defining a pair of longitudinal slots located in opposed relation on a common diameter and adapted to receive the cord, the sleeve further having a pair of opposed outwardly tapering locking flats in spaced relation to the disk portion and having their greatest reach along a diameter normal to the diameter defined by the slots, whereby the sleeve may be flexed to reduce the reach of the locking flats; and a cover of transparent material having a circular disk portion with a depending skirt, the skirt having a pair of opposed marginal openings to receive the cord, the circular disk portion further having a centrally disposed opening adapted to pass over the locking flats of the sleeve when the sleeve is flexed to collapsed condition and to seat against the flats and hold the skirt in engagement with the base when the sleeve is not collapsed.

References Cited in the file of this patent

UNITED STATES PATENTS

| | | |
|---|---|---|
| 1,386,918 | Westrup | Aug. 9, 1921 |
| 2,438,805 | Hoyle | Mar. 30, 1948 |
| 2,449,464 | Eypper | Sept. 14, 1948 |
| 2,521,226 | Keller | Sept. 5, 1950 |
| 2,553,880 | Stigler | May 22, 1951 |
| 2,565,339 | Anderson | Aug. 21, 1951 |
| 2,656,991 | Neely | Oct. 27, 1953 |
| 2,681,731 | Chambers | June 22, 1954 |

FOREIGN PATENTS

| | | |
|---|---|---|
| 286,206 | Switzerland | Feb. 2, 1953 |
| 380,255 | Great Britain | Sept. 15, 1932 |